(12) United States Patent
Hwang

(10) Patent No.: US 11,481,811 B2
(45) Date of Patent: Oct. 25, 2022

(54) ELECTRONIC DEVICE AND METHOD FOR CONTROLLING SAME

(71) Applicant: Samsung Electronics Co., Ltd., Suwon-si (KR)

(72) Inventor: Yunhee Hwang, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 24 days.

(21) Appl. No.: 17/269,376

(22) PCT Filed: Sep. 30, 2019

(86) PCT No.: PCT/KR2019/012676
§ 371 (c)(1),
(2) Date: Feb. 18, 2021

(87) PCT Pub. No.: WO2020/071697
PCT Pub. Date: Apr. 9, 2020

(65) Prior Publication Data
US 2021/0182913 A1   Jun. 17, 2021

(30) Foreign Application Priority Data

Oct. 5, 2018 (KR) .................. 10-2018-0119200

(51) Int. Cl.
*G06Q 30/02* (2012.01)
*G06N 20/00* (2019.01)
(Continued)

(52) U.S. Cl.
CPC ..... *G06Q 30/0269* (2013.01); *G06F 16/9017* (2019.01); *G06N 20/00* (2019.01);
(Continued)

(58) Field of Classification Search
CPC .......... G06Q 30/0269; G06Q 30/0256; G06Q 30/0261; G06Q 30/0267; G06N 20/00;
(Continued)

(56) References Cited

U.S. PATENT DOCUMENTS 8,321,266 B2 * 11/2012 Cho .................. G06Q 30/0243
725/86
9,959,547 B2   5/2018 Lewis et al.
(Continued)

FOREIGN PATENT DOCUMENTS

| CN | 107103016 A | 8/2017 |
|----|-------------|--------|
| JP | 2016-053965 A | 4/2016 |

(Continued)

OTHER PUBLICATIONS

Grier, 2005_.*
(Continued)

*Primary Examiner* — Michael I Ezewoko
(74) *Attorney, Agent, or Firm* — Jefferson IP Law, LLP

(57) ABSTRACT

Provided are an electronic device and a method for controlling same. The present method for controlling the electronic device may allow for on the basis of an image obtained by a camera of the electronic device, acquiring information associated with the user, identifying at least one advertisement category among a plurality of advertisement categories; when an event for displaying an advertisement occurs, transmitting information on the at least one advertisement category to an advertisement platform server; and receiving an advertisement in the at least one advertisement category from the advertisement platform server.

15 Claims, 12 Drawing Sheets

(51) Int. Cl.
*G06F 16/901* (2019.01)
*G06V 20/30* (2022.01)
*G06V 40/20* (2022.01)

(52) U.S. Cl.
CPC ..... *G06Q 30/0256* (2013.01); *G06Q 30/0261* (2013.01); *G06Q 30/0267* (2013.01); *G06V 20/30* (2022.01); *G06V 40/20* (2022.01)

(58) Field of Classification Search
CPC ............ G06F 16/9017; G06K 9/00335; G06K 9/00677
See application file for complete search history.

(56) References Cited

U.S. PATENT DOCUMENTS

| | | | |
|---|---|---|---|
| 9,965,768 | B1 | 5/2018 | Doane et al. |
| 10,210,627 | B1* | 2/2019 | Vitsnudel ............. G06V 10/454 |
| 10,235,387 | B2 | 3/2019 | Zhu et al. |
| 10,296,538 | B2 | 5/2019 | Jiang et al. |
| 10,395,281 | B2* | 8/2019 | Greif ................. G06Q 30/0276 |
| 10,445,558 | B2* | 10/2019 | Huang ..................... G06N 3/08 |
| 2016/0027063 | A1 | 1/2016 | Wexler et al. |
| 2016/0258762 | A1* | 9/2016 | Taylor .................... G06V 20/20 |
| 2017/0039452 | A1 | 2/2017 | Osindero et al. |
| 2017/0236407 | A1* | 8/2017 | Rhoads .................. G06F 16/29 455/420 |
| 2017/0242875 | A1 | 8/2017 | Jiang et al. |
| 2017/0255647 | A1 | 9/2017 | Zhu et al. |
| 2018/0046855 | A1 | 2/2018 | Ganong et al. |
| 2018/0082338 | A1 | 2/2018 | Herman et al. |
| 2018/0189841 | A1 | 7/2018 | Lee et al. |
| 2019/0378171 | A1* | 12/2019 | Bhat ...................... G06K 9/627 |

FOREIGN PATENT DOCUMENTS

| | | |
|---|---|---|
| JP | 2017-157193 A | 9/2017 |
| KR | 10-2012-0139251 A | 12/2012 |
| KR | 10-1517674 B1 | 5/2015 |
| KR | 10-2016-0012902 A | 2/2016 |
| KR | 10-2017-0046354 A | 5/2017 |
| KR | 10-1762408 B1 | 7/2017 |
| KR | 10-2018-0040390 A | 4/2018 |
| KR | 10-2018-0079885 A | 7/2018 |
| KR | 10-2018-0098073 A | 9/2018 |

OTHER PUBLICATIONS

Edelman, 2008.*
Wirth, 1976.*
Dam, 2013.*
Goffman, 1974.*
Kuhn, 1962.*
Hayles, 2005_.*
Lakoff, 1980.*
Mindell, 2015_.*
Treffert, 2010.*
Aguilar, Mar. 2018.*
Fu, 2010.*
Khryaschev, 2014.*
Nigam, 2016.*
Krumm, 2011.*
Yang, 2016.*
Extended European Search Report dated Jul. 14, 2021, issued in European Patent Application No. 19868586.9-1213.

* cited by examiner

FIG. 6

| SEX | AGE | FIRST-PRIORITY CATEGORY | SECOND-PRIORITY CATEGORY | THIRD-PRIORITY CATEGORY |
|---|---|---|---|---|
| MALE | 10S | EDUCATION | GAME | CLOTHING |
| | 20S | EMPLOYMENT | EDUCATION | GAME |
| | 30S | EMPLOYMENT | STOCK | MARRIAGE |
| | 40S | | | |
| | ⋮ | | | |
| FEMALE | 10S | EDUCATION | CLOTHING | COSMETIC |
| | 20S | EMPLOYMENT | TRAVEL | CLOTHING |
| | 30S | CHILDCARE | CLOTHING | TRAVEL |
| | ⋮ | | | |

(a)  (b)

ELECTRONIC DEVICE AND METHOD FOR CONTROLLING SAME

TECHNICAL FIELD

The disclosure relates to an electronic apparatus and a method for controlling the same. More particularly, the disclosure relates to an electronic apparatus which provides an optimal advertisement to a user based on information related to the user, and a method for controlling thereof.

BACKGROUND ART

As the use of electronic apparatuses such as smart phones becomes more common and usage time of the apparatuses increases, there is an increasing need to provide advertisements using electronic apparatuses such as smart phones to firms that want to advertise products and services.

In particular, in the case of providing advertisements using an electronic apparatus, it is very important to identify user preferences or interests. This is because if an arbitrary advertisement is provided regardless of the user's preferences or interests, the effect of providing advertisements may be very small.

Recently, service that advertisement platform companies collect users' personal information such as web site access record, search record or the like, and provides optimal advertisements to the users based on the collected information has appeared.

However, user personal information, such as web site access record or search record, has a limitation in that the user consent must be obtained due to the personal information protection issue, and there is a problem that services cannot be provided without user consent. Accordingly, it is requested to find a way that the electronic apparatus does not transmit the user's personal information itself and provide the optimal advertisement to the user.

DETAILED DESCRIPTION OF THE INVENTION

Technical Problem

The disclosure was devised to solve the problem described above, and an object of the disclosure is to provide an electronic apparatus which transmits advertisement category information determined based on information related to the user to an advertisement platform server, and provides optimal advertisement for users without transmitting the user's personal information itself, and a method for controlling the same.

Technical Solution

According to an embodiment of the disclosure, an electronic apparatus includes a camera, a communication interface, a memory including at least one command, and a processor configured to be connected to the camera, the communication interface, and the memory to control the electronic apparatus, wherein the processor is configured to, by executing the at least one command, obtain information related to a user of the electronic apparatus, determine at least one category among a plurality of advertisement categories based on the information related to the user, based on an event for displaying an advertisement being occurred, control the communication interface to transmit information on the at least one advertisement category to and advertisement platform server, and receive an advertisement in the at least one advertisement category from the advertisement platform server through the communication interface.

According to an embodiment of the disclosure, a method for controlling an electronic apparatus includes acquiring information related to a user of the electronic apparatus based on an image obtained by a camera of the electronic apparatus, determining at least one category among a plurality of advertisement categories based on the information related to the user, based on an event for displaying an advertisement being occurred, transmitting information on the at least one advertisement category to and advertisement platform server, and receiving an advertisement in the at least one advertisement category from the advertisement platform server through the communication interface.

According to an embodiment of the disclosure, in a non-transitory computer-readable recording medium storing a program for executing a method for controlling an electronic apparatus, the method for controlling the electronic apparatus includes acquiring information related to a user of the electronic apparatus based on an image obtained by a camera of the electronic apparatus, determining at least one category among a plurality of advertisement categories based on the information related to the user, based on an event for displaying an advertisement being occurred, transmitting information on the at least one advertisement category to and advertisement platform server, and receiving an advertisement in the at least one advertisement category from the advertisement platform server through the communication interface.

Effect of the Invention

By this disclosure as described above, the user may be provided with the optimal advertisement without a risk of leakage of the user's personal information to the outside, and the advertiser may provide the optimal advertisement corresponding to an advertisement category determined based on the user information such that an effect of providing the advertisement may be increased.

BRIEF DESCRIPTION OF DRAWINGS

FIG. 6 is a view illustrating a matching table stored in an advertisement category database according to an embodiment;

BEST MODE FOR IMPLEMENTING THE DISCLOSURE

Figure 1:
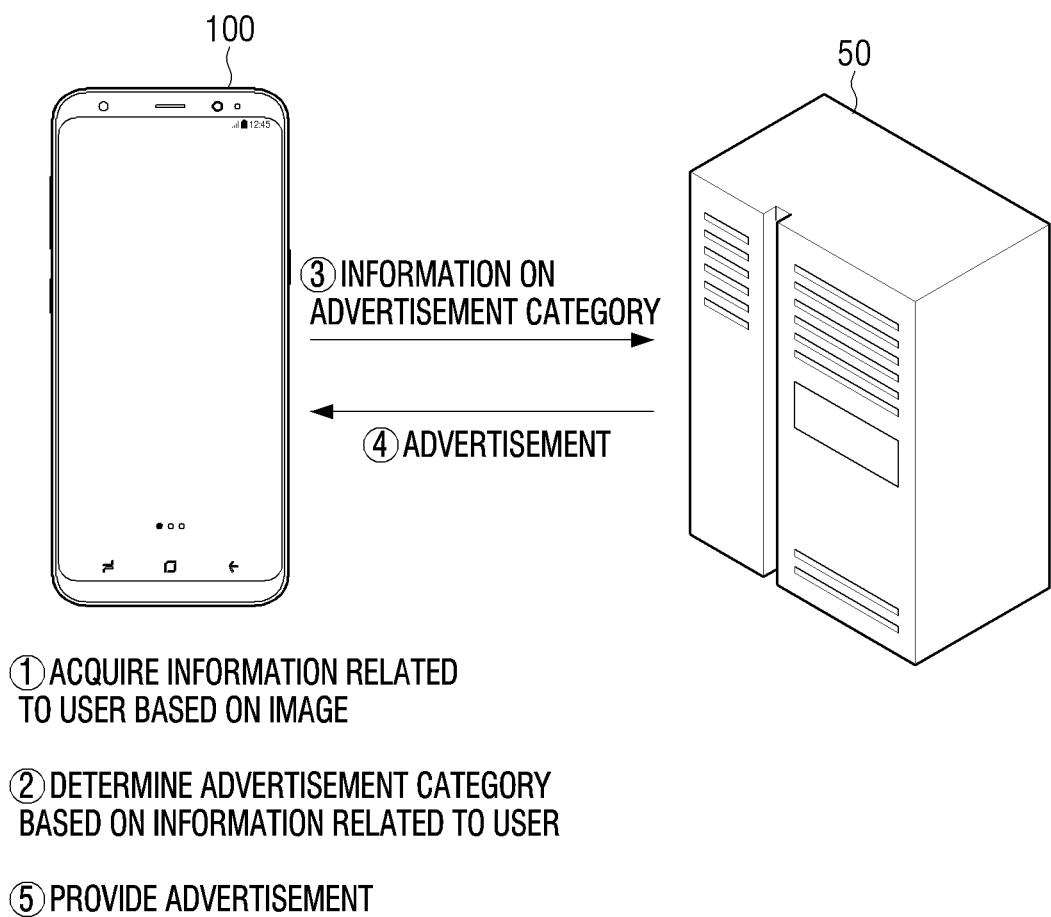
FIG. 1 is a use diagram illustrating a system for providing advertisements according to information associated with a user according to an embodiment.

The above and other aspects, features, and advantages of certain embodiments of the disclosure will be more apparent from the following description taken in conjunction with the accompanying drawings, in which: However, it should be understood that the disclosure is not limited to the specific embodiments described hereinafter, but includes various modifications, equivalents, and/or alternatives of the embodiments of the disclosure. In relation to explanation of the drawings, similar drawing reference numerals may be used for similar constituent elements.

The terms "have", "may have", "include", and "may include" used in the exemplary embodiments of the present disclosure indicate the presence of corresponding features (for example, elements such as numerical values, functions, operations, or parts), and do not preclude the presence of additional features.

In the description, the term "A or B", "at least one of A or/and B", or "one or more of A or/and B" may include all possible combinations of the items that are enumerated together. For example, the term "A or B" or "at least one of A or/and B" may designate (1) at least one A, (2) at least one B, or (3) both at least one A and at least one B.

The expression "1", "2", "first", or "second" as used herein may modify a variety of elements, irrespective of order and/or importance thereof, and only to distinguish one element from another. Accordingly, without limiting the corresponding elements.

If it is described that a certain element (e.g., first element) is "operatively or communicatively coupled with/to" or is "connected to" another element (e.g., second element), it should be understood that the certain element may be connected to the other element directly or through still another element (e.g., third element). Meanwhile, if it is described that a certain element (e.g., first element) is "directly coupled with/to" or "directly connected to" another element (e.g., second element), it may be understood that no other element (e.g., third element) exists between the certain element and the other element.

In the description, the term "configured to" may be changed to, for example, "suitable for", "having the capacity to", "designed to", "adapted to", "made to", or "capable of" under certain circumstances. The term "configured to (set to)" does not necessarily mean "specifically designed to" in a hardware level. Under certain circumstances, the term "device configured to" may refer to "device capable of" doing something together with another device or components. For example, a phrase "a sub-processor configured to (set to) perform A, B, and C" may refer to a generic-purpose processor (e.g., CPU or application processor) capable of performing corresponding operations by executing a dedicated processor (e.g., embedded processor) for performing corresponding operation, or executing one or more software programs stored in a memory device.

An electronic apparatus according to various exemplary embodiments may include at least one of, for example, smartphone, tablet PC, mobile phone, video phone, e-book reader, desktop PC, laptop PC, netbook computer, workstation, server, PDA, portable multimedia player (PMP), MP3 player, medical device, camera, or a wearable device. wearable devices may include at least one of accessories (e.g. watches, rings, bracelets, anklets, necklaces, glasses, contact lenses, or head-mounted-devices (HMD)), fabrics or clothing (e.g. electronic clothing), a body attachment type (e.g., a skin pad or a tattoo), or a bio-implantable circuit. The electronic apparatuses according to various embodiments described above may include at least one of a television, a digital video disk (DVD) player, audio, refrigerator, air conditioner, cleaner, oven, microwave, washing machine, air purifier, set top box, home automation control panel, security control panels, media boxes (e.g., the Samsung HomeSync™, Apple the TV™, or Google the TV™), a game console (e.g., Xbox™, the PlayStation™s), electronic dictionaries, electronic keys, cameras, or a digital photo frame.

In another embodiment, the electronic apparatus may include at least one of various medical devices (e.g., various portable medical measurement devices (such as a blood glucose meter, heart rate monitor, blood pressure meter, body temperature meter, etc.), magnetic resonance angiography (MRA), magnetic resonance imaging (MRI), computed tomography (CT), camera, or ultrasound, etc.), navigation device, global navigation satellite system (GNSS), event data recorder (EDR), flight data recorder (FDR), automotive infotainment device, marine electronic equipment (e.g., navigational devices for ships, gyro compasses, etc.), avionics, security devices, head units for vehicles, industrial or household robots, drones, ATMs in financial institutions, point-of-sale (POS) for stores sales, or Internet of Things devices (e.g., light bulbs, various sensors, sprinkler devices, fire alarms, thermostats, street lights, toasters, exercise equipment, hot water tanks, heaters, boilers, etc.).

In this disclosure, the term "a user" may indicate a person using an electronic apparatus or an apparatus which uses an electronic apparatus (for example, artificial intelligent electronic apparatus).

One or more exemplary embodiments will be described in detail with reference to the accompanying drawings. FIG. 1 is a use diagram illustrating a system for providing advertisements according to information associated with a user according to an embodiment of the disclosure.

The electronic apparatus 100 may obtain an image. In this case, the electronic apparatus 100 may obtain an image through at least one camera and may receive an image from an external device (or an external server). The image obtained by the electronic apparatus 100 may include at least one person.

The electronic apparatus 100 may obtain information associated with the user of the electronic apparatus 100 based on the obtained image.

Specifically, the electronic apparatus 100 may identify a person who appears most frequently among a plurality of people included in a plurality of images obtained through a camera (in particular, a front camera provided on a side where the display is placed) of the electronic apparatus 100 as a user of the electronic apparatus 100 during a self-portrait mode. In addition, the electronic apparatus 100 may obtain various information (e.g., age, gender, body size information, etc.) about a person identified as a user obtained by using an artificial intelligence model for object recognition.

In another embodiment, the electronic apparatus 100 may analyze an image and text uploaded by the user on SNS, or analyze an image and text transmitted by the user to an external device to identify an image including the user. For example, when the user uploads the text "the photo of me that I took today" together with an image on the SNS, the electronic apparatus 100 may identify that the user is included in the image uploaded on the SNS through text analysis. In addition, the electronic apparatus 100 may obtain information on the user included in the image uploaded on the SNS or an image transmitted to an external device by using an artificial intelligence model for object recognition.

Also, the electronic apparatus 100 may identify a person who appears more than a preset number of times among a plurality of people included in a plurality of images stored in a memory as a person related to the user (e.g., family, friends, etc.). In addition, the electronic apparatus 100 may obtain various information (e.g., age, gender, body size information, etc.) about a person related to the user obtained by using an artificial intelligence model for object recognition.

In another embodiment, the electronic apparatus 100 may identify an image including a person related to the user by analyzing the image and text uploaded by the user on SNS or the image and text transmitted to the external device. For example, when the user uploads a text "Isn't my son pretty?" along with an image including a baby on SNS, the electronic apparatus 100 may identify that a person (in particular, family etc.) related to the user is included in the image uploaded on SNS through text analysis. In addition, the electronic apparatus 100 may obtain various information about the person related to the user included in the image uploaded on SNS or the image transmitted to the external device by using the artificial intelligence model for object recognition.

The electronic apparatus 100 may determine at least one of a plurality of advertisement categories based on the obtained information related to the user. Specifically, the electronic apparatus 100 may store a matching table matching and storing at least one advertisement category predetermined according to a user type in the memory. For example, the matching table may store at least one advertisement category predetermined according to the user type such as teenage boys, female in their 20s, or the like. In this case, the matching table may match and store the plurality of advertisement categories predetermined according to the user type in priority order. For example, the matching table may store the order of a job advertisement category as a first priority, a travel advertisement category as a second priority, and a cosmetic advertisement category as a third priority for female in their twenties. In this case, the matching table may be periodically updated by an external server, and may be updated based on the user's context information.

The electronic apparatus 100 may determine advertisement category information corresponding to the obtained information related to the user by using the matching table. For example, if the information related to the user obtained through the image is "a woman in her 30s", the electronic apparatus 100 may use the matching table to determine "childcare advertisement category", "travel advertisement category", and "clothing advertisement category", which are advertisement categories matched with the woman in their 30s, as an advertisement category corresponding to the user.

Also, the electronic apparatus 100 may determine advertisement category information based on user context information (e.g., user preference information, user location information, etc.) in addition to information related to the user as described above.

Specifically, information on a movement pattern of the user may be obtained based on location information of the electronic apparatus 100 obtained by a sensor provided in the electronic apparatus 100. In addition, the electronic apparatus 100 may identify an area of interest of the user based on search results and website visit history of the user. Also, the electronic apparatus 100 may obtain information on the user's product purchase history.

In addition, the electronic apparatus 100 may determine advertisement category information based on user context information. For example, the electronic apparatus 100 may identify a location where the user lives, a workplace or a school where the user goes to. etc., based on information on the movement pattern of the user 100, and determine the advertisement category information based on the location where the user lives or the workplace or school the user goes to. As another example, when the user's interests is travel, the electronic apparatus 100 may determine the "travel advertisement category", which is the user's interests, as an advertisement category corresponding to the user. As another example, if a product mainly purchased by the user is a childcare product, the electronic apparatus 100 may determine "childcare advertisement category" as an advertisement category corresponding to the user based on the user's purchase information.

Meanwhile, in the embodiment described above, it has been described that the advertisement category is determined based on information related to the user or user context information, but this is only an embodiment, and the electronic apparatus 100 may determine user context information along with information related to the user. The electronic apparatus 100 may determine advertisement category information or prioritize advertisement categories based on user context information along with information related to the user. For example, if the information related to the user is "a man in his 30s" and the user's interests is "game", the electronic apparatus 100 may determine "game advertisement category" as an advertisement category corresponding to the user along with "child care advertisement category" and "home appliance advertisement category", which are advertisement categories corresponding to male in their 30s. Alternatively, the electronic apparatus 100 may determine an advertisement category by assigning a high priority to an advertisement category corresponding to the user's interests.

When an event for displaying an advertisement occurs, the electronic apparatus 100 may transmit information on at least one advertisement category to an advertisement platform server 50. In this case, the event for displaying advertisements may include, but are not limited to, an event for the user to access a specific website or an event for watching a video on a website that provides videos. In addition, the electronic apparatus 100 may transmit information on at least one advertisement category corresponding to the user to the advertisement platform server 50 before an event for displaying advertisement occurs. The advertisement platform server 50 may be a server owned by the advertisement platform company that provides advertisements requested by a plurality of advertisers, but this is only an embodiment, and the technical idea of the disclosure may also be applied to the server provided by the advertiser.

Also, when transmitting information on the plurality of advertisement categories, the electronic apparatus 100 may also transmit priority information on the plurality of advertisement categories.

The advertisement platform server 50 may determine an advertisement to be provided to the user based on at least one advertisement category or priority information, and may transmit the determined advertisement to the electronic apparatus 100.

The electronic apparatus 100 may display an advertisement received from the advertisement platform server 50. In this case, the electronic apparatus 100 may determine at least one of a size and a location in which the advertisement received from the advertisement platform server will be displayed based on the priority of the advertisement category. For example, as the priority of the advertisement category is higher, the electronic apparatus 100 may increase a size in which the advertisement is to be displayed, and determine a location in which the advertisement is to be displayed as a top.

Meanwhile, the object recognition model mentioned in the embodiment described above is a judgment model learned based on an artificial intelligence algorithm, and may be, for example, a model based on a neural network. In addition, the electronic apparatus 100 may obtain information related to the user using the object recognition model as described above, determine an advertisement category corresponding to the obtained information related to the user, and use, a personal assistant program that is an artificial intelligence-only program (or artificial intelligence agent) in order to receive an advertisement corresponding to the advertisement category determined from the advertisement platform server 50. In this case, the personal assistant program is a dedicated program for providing artificial intelligence (AI)-based services, and may be executed by an existing general-purpose processor (e.g., CPU) or a separate AI-only processor (e.g., GPU).

Specifically, when a user input for entering a predetermined mode (e.g., active advertisement providing mode) is detected, the electronic apparatus 100 may operate (or execute) an artificial intelligence agent. In addition, the artificial intelligence agent may analyze the image stored in the electronic apparatus 100 to obtain information related to the user or obtain user context information based on usage information of the electronic apparatus 100, determine advertisement category information based on the obtained information related to the user or the user context information, and receive an advertisement corresponding to the determined advertisement category from an external advertisement platform company.

According to the embodiment of the disclosure as described above, the electronic apparatus 100 may provide an optimal advertisement to the user without risk of leakage of the user's personal information.

Figure 2:
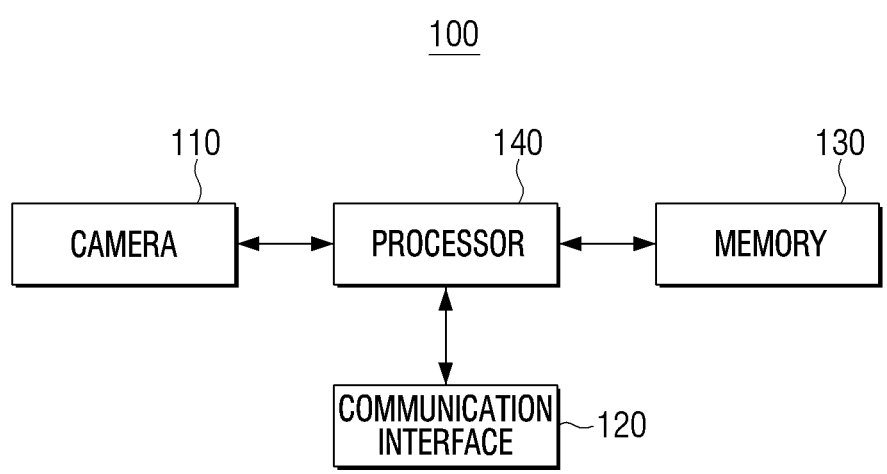
FIGS. 2 and 3 are block diagrams illustrating a configuration of an electronic apparatus according to an embodiment.

FIG. 2 is a block diagram illustrating a configuration of an electronic apparatus 100. As illustrated in FIG. 2, the electronic apparatus 100 may include a camera 110, a communicator (comprising circuitry) 120, a memory 130, and a processor 140. In this case, the configurations illustrated in FIG. 2 are exemplary views illustrating embodiments of the disclosure, and appropriate hardware/software configurations that are obvious to those skilled in the art may additionally be included in the electronic apparatus 100 or the configuration illustrated in FIG. 2 may be omitted.

The camera 110 may obtain an image. In addition, a plurality of cameras 110 may be provided on a front surface and a rear surface of the electronic apparatus 100. In particular, the electronic apparatus 100 may obtain a selfie image through a camera positioned in front of the camera 110 (surface on which the display is present). Meanwhile, the camera 110 may be provided on a main body of the electronic apparatus 100, but this is only an embodiment, and may be provided outside the electronic apparatus 100 and electrically connected to the electronic apparatus 100.

The communication interface 120 may communicate with an external device. The communication interface 120 is a configuration for performing communication with the external apparatus. Meanwhile, communication of the communication interface 120 with the external device may include communication through a third device (e.g., a repeater, a hub, an access point, a server, or a gateway). The wireless communication, for example, may include a cellular communication using at least one among long-term evolution (LTE), LTE Advance (LTE-A), code division multiple access (CDMA), wideband CDMA (WCDMA), universal mobile telecommunications system (UMTS), Wireless Broadband (WiBro), and Global System for Mobile Communications (GSM). According to an exemplary embodiment, wireless communication may include at least one of, for example, wireless fidelity (Wi-Fi), Bluetooth, Bluetooth Low Energy (BLE), Zigbee, near field communication (NFC), Magnetic Secure Transmission, radio frequency RF, or body area network BAN. Wired communication may include at least one of, for example, universal serial bus (USB), high-definition multimedia interface (HDMI), recommended standard232 (RS-232), power line communication, or plain old telephone service (POTS). The network in which wireless communication or wired communication is performed may include at least one of telecommunication network, for example, a computer network (e.g., LAN or WAN), the Internet, or a telephone network.

For example, the communication interface 120 may transmit information on an advertisement category to the external advertisement platform server 50 and may receive an advertisement determined based on information on the advertisement category from the advertisement platform server 50.

In addition, the communication interface 120 may receive an image for acquiring information related to the user or various information for acquiring context information from an external electronic apparatus.

The memory 130, for example, may store a command or data regarding at least one of the other elements of the electronic apparatus 100. The memory 130 may be implemented as a non-volatile memory, a volatile memory, a flash memory, a hard disk drive (HDD) or a solid state drive (SDD). The memory 130 may be accessed by the processor 140, and perform readout, recording, correction, deletion, update, and the like, on data by the processor 140. According to an embodiment of the disclosure, the term of the storage may include the memory 130, read-only memory (ROM) (not illustrated) and random-access memory (RAM) (not illustrated) within the processor 140, and a memory card (not illustrated) attached to the electronic apparatus 100 (e.g., micro secure digital (SD) card or memory stick). Further, the memory 130 may store programs, data, and so on to constitute various screens to be displayed on the display area of the display.

In addition, the memory 130 may store an artificial intelligence agent for operating the object recognition model. Specifically, the electronic apparatus 100 may use an artificial intelligence agent to drive an object recognition model for acquiring information related to the user by analyzing an image. In this case, the artificial intelligence agent is a dedicated program for providing artificial intelligence (AI)-based services (e.g., voice recognition service, secretary service, translation service, search service, advertisement providing service, etc.). In particular, the artificial intelligence agent may be executed by an existing general-purpose processor (e.g., CPU) or a separate AI dedicated processor (e.g., GPU, etc.).

Figure 4:
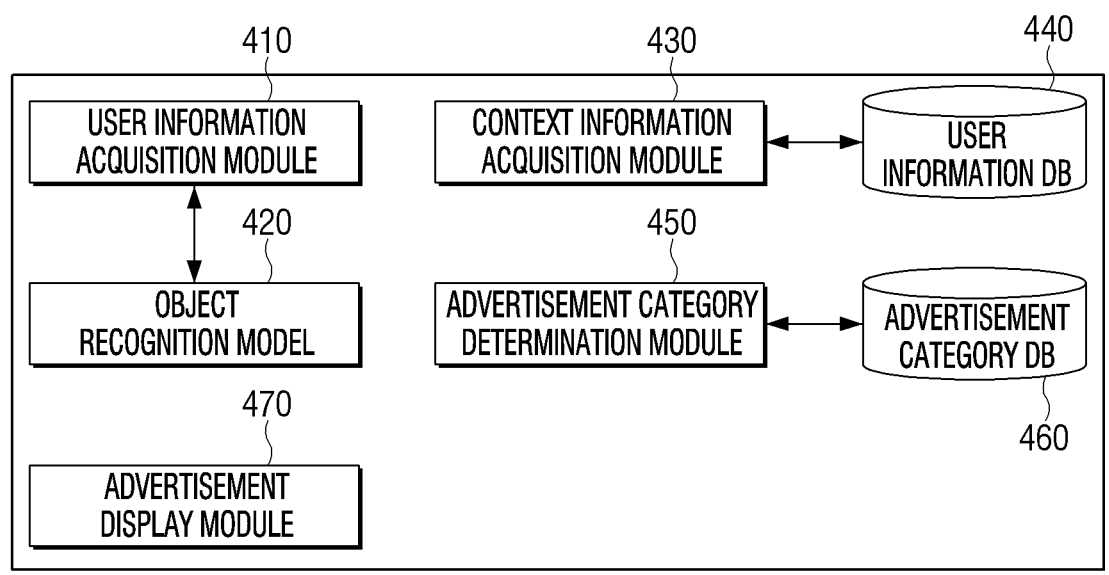
FIG. 4 is a block diagram illustrating configurations for providing advertisements according to information associated with a user according to an embodiment.

As shown in FIG. 4, the memory 130 may include a plurality of components (or modules) for providing advertisements to the user. This will be described in detail with reference to FIG. 4.

In particular, the memory 130 may store a matching table for matching and storing at least one advertisement category predetermined according to the user type. In this case, the matching table may match and store a plurality of advertisement categories predetermined according to the user type in priority order. Also, the matching table may be periodically updated by an external server.

The processor 140 may be electrically connected to the memory 130 to control overall operations and functions of the electronic apparatus 100. In particular, the processor may obtain information related to the user of the electronic apparatus 100 based on the image obtained by the camera 110 by executing at least one command stored in the memory 130, and determines at least one of a plurality of advertisement categories based on the information related to the user, and when an event for displaying an advertisement occurs, control the communication interface 120 to transmit information on the at least one advertisement category to the advertisement platform server 50, and receive an advertisement for at least one advertisement category from the advertisement platform server 50 through the communication interface 120.

Specifically, the processor 140 may identify that a person who appears most frequently among a plurality of people included in a plurality of images obtained through the camera 110 (especially, the camera provided in front of the electronic apparatus 100) during the self-portrait mode as the user. In addition, the processor 140 may obtain age, gender, and body size information for the person identified as the user by using the artificial intelligence model for object recognition.

In addition, the processor 140 may identify a person who appears more than a predetermined number of times among a plurality of people included in the plurality of images stored in the memory 130 as a person related to the user (e.g., family, friend, etc.). Further, the processor 140 may obtain age, gender, and body size information for a person related to the user by using the artificial intelligence model for object recognition.

As described above, the processor 140 may determine an advertisement category based on obtained information about the user or information about the person related to the user. In particular, the processor 140 may determine advertisement category information corresponding to the obtained information related to the user by using the matching table stored in the memory 130.

In addition, the processor 140 may obtain information on the advertisement category based on the user's context information together with the information related to the user.

Specifically, the processor 140 may obtain information on the movement pattern of the user based on the location information of the electronic apparatus obtained by a sensor provided in the electronic apparatus 100, and determine at least one of the plurality of advertisement categories based on the information related to the user and the movement pattern of the user.

In addition, the processor 140 may identify the user's interests based on user's search results and visit history of websites, and determine at least one of the plurality of advertisement categories based on the information related to the user and the user's interests.

In addition, the processor 140 may obtain information on the user's product purchase history, and may determine at least one advertisement category among the plurality of advertisement categories based on the information related to the user and the user's product purchase history.

Further, the processor 140 may control the communication interface 120 to transmit information on the determined advertisement category to the advertisement platform server 50. In this case, the advertisement category information may include priority information of the plurality of advertisement categories.

Further, the processor 140 may receive an advertisement corresponding to the advertisement category information from the advertisement platform server 50 through the communication interface 120 and display the received advertisement. In particular, the processor 140 may determine at least one of a size and a location in which an advertisement received from the advertisement platform server 50 is displayed based on the priority of the advertisement category.

Figure 3:
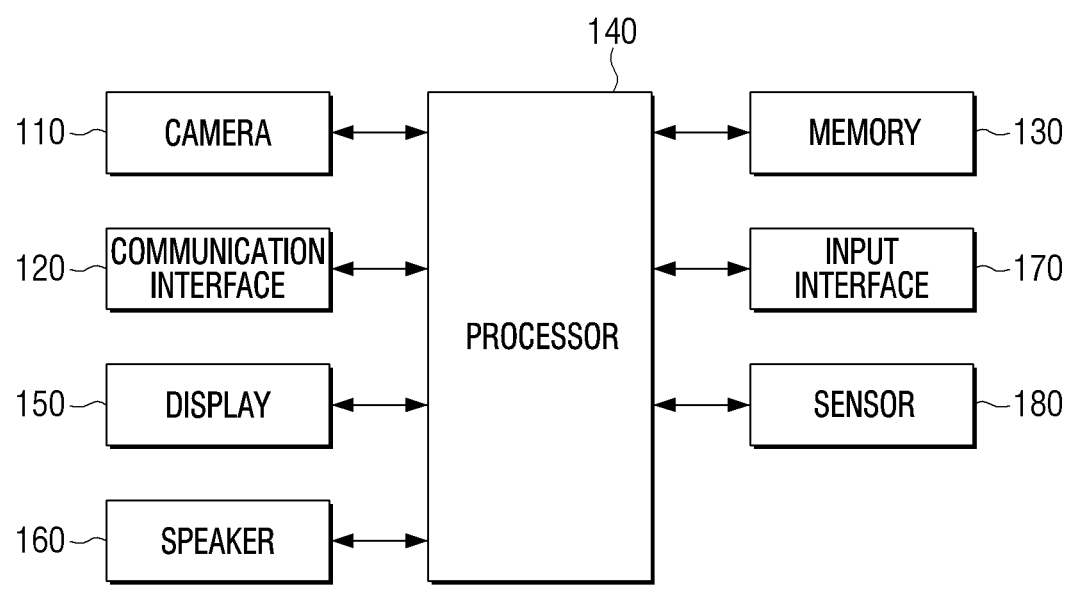

FIG. 3 is a block diagram illustrating a detailed configuration of an electronic apparatus according to an embodiment of the disclosure. The electronic apparatus 100 may include a camera 110, a communication interface 120, a display 150, a speaker 160, a memory 130, an input interface 170, a sensor 180, and a processor 140. Meanwhile, since the camera 110, the communication interface 120, the memory 130, and the processor 140 illustrated in FIG. 3 have been described in FIG. 2, a duplicate description will be omitted.

The display 150 may display various information under the control of the processor 140. In particular, the display 150 may display an advertisement corresponding to an advertisement category. In this case, the display 150 may provide advertisements corresponding to a plurality of advertisement categories to a plurality of advertisement areas included in the screen. In this case, the display 150 may provide advertisements to the plurality of advertisement areas based on a display size and display area of the advertisement determined by the processor 140 according to a priority of the advertisement category. Meanwhile, the display 150 may be implemented as a touch screen together with a touch panel.

The speaker 160 may include various audio output circuitry and is configured to output various kinds of alarm sounds or voice messages in addition to various audio data on which various processing operations such as decoding, amplification, and noise filtering are performed by an audio processor. In particular, the speaker 160 may output a voice message included in an advertisement. Meanwhile, a configuration for outputting audio may be implemented as a speaker, but this is only an example, and may be implemented as an output terminal capable of outputting audio data.

The input interface 170 may receive a user input for controlling the electronic apparatus 100. In particular, the input interface 110 may include a microphone for receiving a user voice, a touch panel for receiving a user touch using a user's hand or a stylus pen, a button for receiving a user manipulation, or the like. However, the example of the input interface 110 illustrated in FIG. 3 is only an embodiment, and may be implemented with other input devices (e.g., keyboard, mouse, motion input unit, etc.).

The sensor 180 may detect various state information of the electronic apparatus 100. For example, the sensor 180 may include a motion sensor (e.g., gyro sensor, acceleration sensor, etc.) capable of detecting motion information of the electronic apparatus 100, and a sensor capable of detecting location information (e.g., global positioning system (GPS) sensor), a sensor that can detect environmental information around the electronic apparatus 100 (e.g., temperature sensor, humidity sensor, air pressure sensor, etc.), a sensor that can detect user information of the electronic apparatus 100 (e.g., blood pressure sensor, blood sugar sensor, pulse rate sensor, etc.), or the like.

FIG. 4 is a block diagram illustrating configurations for providing advertisements according to information related to the user according to an embodiment of the disclosure. As illustrated in FIG. 4, the electronic apparatus 100 may include a user information acquisition module 410, an object recognition model 420, a context information acquisition module 430, a user information DB 440, and an advertisement category determination module 450, an advertisement category DB 460, and an advertisement display module 470. The configuration illustrated in FIG. 4 may be implemented as software and stored in the memory 130, but this is only an example, and at least one configuration may be implemented with separate dedicated hardware (e.g., dedicated processor chip).

The user information acquisition module 410 may obtain information related to the user by analyzing an image obtained through the camera 110 or an image received from an external device. In particular, the user information acquisition module 410 may analyze the image obtained through a camera positioned in front of the electronic apparatus during the self-portrait mode to determine a user who is detected with the most frequency among people included in the image. Specifically, the user information acquisition module 410 may classify faces of people included in the image based on a face recognition algorithm, and determine a person detected with the most frequency among the classified faces as a user.

Alternatively, the user information acquisition module 410 may determine the person who is detected more than a predetermined value among a plurality of images stored in the memory 130 as a person related to the user. Specifically, the user information acquisition module 410 may classify the faces of people included in the plurality of images stored in the memory 130 based on a face recognition algorithm, and identify a person detected with a frequency greater than or equal to the predetermined value among the classified faces as a person related to the user.

The user information acquisition module 410 may obtain information (e.g., gender, age, body size, etc.) about the user or the person related to the user by inputting an image including the user or the person related to the user into the object recognition model 420. In this case, the object recognition model may be an artificial intelligence model that is trained to input an image to obtain information on an object included in the image. In this case, the object recognition model 420 may be, for example, a model based on a neural network. The object recognition model may be designed to simulate a human brain structure on a computer and may include a plurality of network nodes having weights, which simulate neurons of a human neural network. The plurality of network nodes may form a connection relationship so as to simulate a synaptic activity of neurons that transmits and receive signals through synapses, respectively. Also, the object recognition model 420 may include, for example, a neural network model or a deep learning model developed from the neural network model. In the deep learning model, the plurality of network nodes may exchange data according to a convolutional connection relationship while being positioned at different depths (or layers). For example, models such as Deep Neural Network (DNN), Recurrent Neural Network (RNN) and Bidirectional Recurrent Deep Neural Network (BRDNN) may be used as a data recognition model, but is not limited thereto.

The context information acquisition module 430 may obtain context information of the user based on usage information of the electronic apparatus 100. Specifically, the context information acquisition module 430 may obtain movement pattern information of the user based on the location information of the electronic apparatus 100 obtained through the sensor 180. For example, the context information acquisition module 430 may obtain information on the user's movement pattern (e.g., home, work, school) based on location information of the electronic apparatus 100.

The context information acquisition module 430 may obtain information on the user's interests (or preferred field) based on user's search results and visit history of websites. For example, when the user frequently searches for soccer or frequently accesses a soccer site, the context information acquisition module 430 may determine the user's interests as soccer.

The context information acquisition module 430 may obtain information on the user's interests based on the user's product purchase history. For example, when the user has a purchase history of child care products, the context information acquisition module 430 may determine child care as the user's interests.

The context information acquisition module 430 may obtain context information for the user based on data or an application stored in the electronic apparatus 100. For example, if a folder named "My Son" exists in the electronic apparatus 100 and an application used in a kindergarten/daycare center exists, the context information acquisition module 430 may obtain context information that the user has a son.

The context information acquisition module 430 may obtain the user's interests based on the user's emotional state detected while watching a specific screen. For example, if it is identified that the user's emotion is positive while watching soccer content, the context information acquisition module 430 may obtain soccer as the user's interests. In this case, the user's emotion may be determined based on the user's voice obtained through a microphone and a text input through the input interface 170.

In addition, the context information acquisition module 430 may obtain the user's context information based on the text included in messages, SNS, e-mail, or the like obtained by the electronic apparatus 100.

Figure 5:
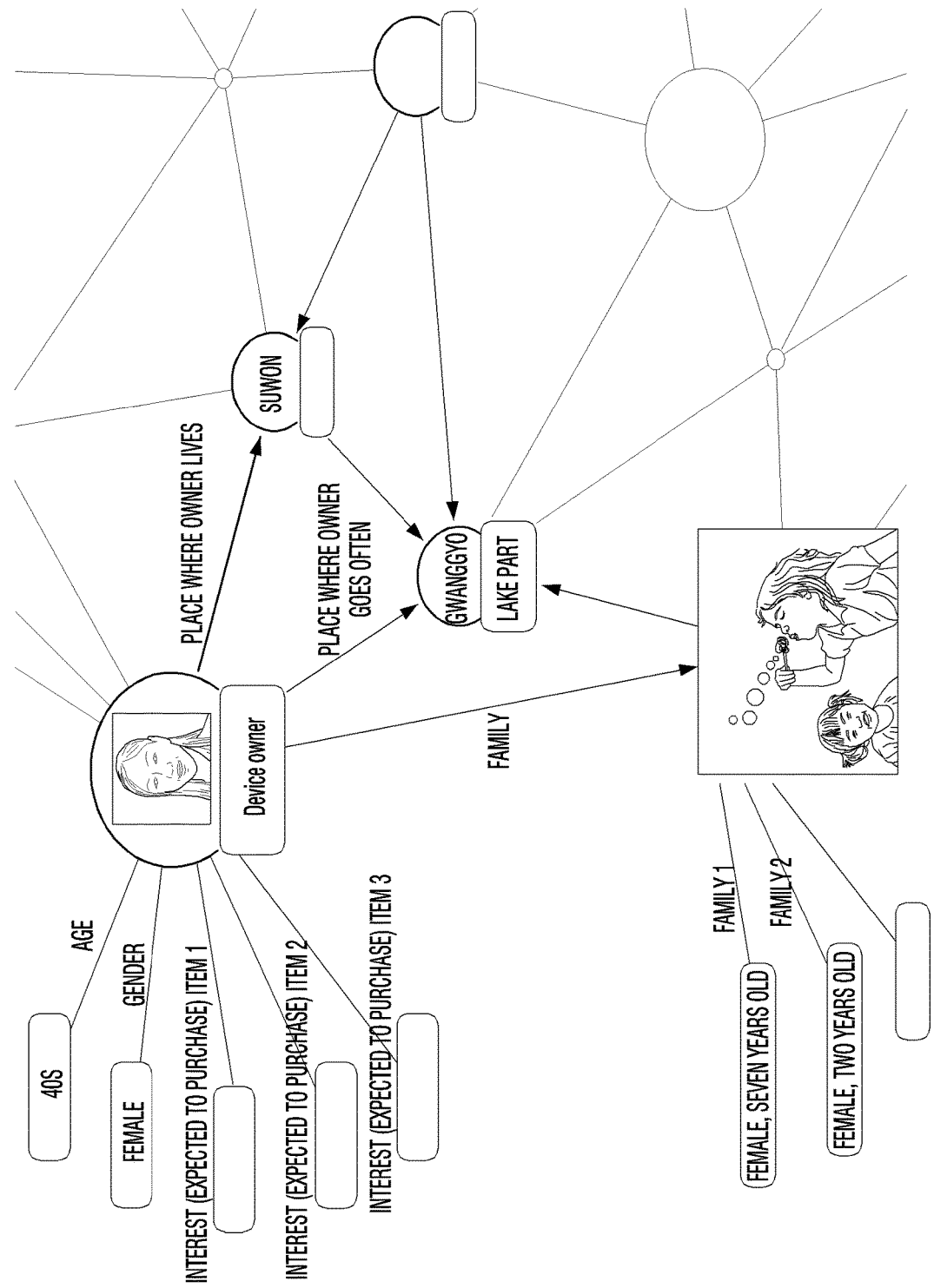
FIG. 5 is a view illustrating information associated with a user stored in a user information database according to an embodiment.

The user information DB 440 may store user information obtained through the user information acquisition module 410 or context information obtained through the context information acquisition module 430. In this case, the user information DB 440 may store user information or context information in the form of a knowledge graph such as RDF, OWL, or the like. In other words, the user information DB 440 may store relationship between the information and the information in the form of a graph, centering on the user, as illustrated in FIG. 5. In other words, the user information DB 440 may store an entity, a relationship between objects, and an attribute type/name, attribute value of an object in the form of a table or graph, and include data in which relationships or attributes are stored in multiple forms in a specific object. For example, as shown in FIG. 5, the user information DB 440 may store a relationship (e.g., family, friend, pet, etc.) between the user and another object and the user's attributes (e.g., age, gender, item of interest, place where the user lives, etc.) in the form of a relationship graph.

In this case, the information stored in the user information DB 440 may be updated whenever user information is obtained by the user information acquisition module 410 or context information is obtained by the context information acquisition module 420. In addition, the relationship graph stored in the user information DB 440 may be updated by acquiring additional information from an external server. For example, as context information, when the user has a pet called Chihuahua, additional information about the Chihuahua (e.g., lifespan, body size, personality, etc.) may be received from the external server and stored in the user DB 440 to update a relationship graph.

The advertisement category determination module 450 may determine an advertisement category optimized for the user among a plurality of advertisement categories based on user information or context information stored in the user information DB 440.

In particular, the advertisement category determination module 450 may determine an advertisement category optimized for the user among the plurality of advertisement categories using a matching table stored in the advertisement category DB 460. Specifically, the matching table stored in the advertisement category DB 460 may match and store at least one advertisement category predetermined according to the user type. For example, as illustrated in FIG. 6, the matching table may store a plurality of advertisement categories corresponding to the user's gender and age. In other words, the matching category may store a plurality of advertisement categories corresponding to male in their 10s, male in their 20s, male in their 30s, male in their 40s, male in their 50s, female in their 10s, female in their 20s, female in their 30s, female in their 40s, and female in their 50s. Meanwhile, in FIG. 6, it has been described that a plurality of advertisement categories are matched and stored according to the user's age and gender. However, this is only an embodiment, the plurality of advertisement categories may be matched and stored according to information related to various users, such as a user's region, occupation, or the like.

In this case, the matching table may match and store the plurality of advertisement categories predetermined according to the user type in priority order. For example, as shown in FIG. 6, a first-priority advertisement category for the teenage male may be an education category. A second-priority advertisement category for the teenage male may be a game category. A third-priority advertisement category for the teenage male may be a clothing category. A first-priority advertisement category for the 20s female may be an employment category. A second-priority advertisement category for the 20s female may be a travel category. A third-priority advertisement category for the 20s female may be a clothing category.

The matching table may be matched with a predetermined advertisement category according to the user type when a program is installed, but this is only an embodiment and may be periodically updated by an external server.

In addition, the matching table may be updated based on user context information. For example, when the user is a man in his 30s and the user's preferred field is a game, the matching table may match and store a game category, which is the user's preferred field, with the male in his 30s.

Meanwhile, the advertisement category determination module 450 may determine a plurality of advertisement categories corresponding to the user among a plurality of advertisement categories based on user information stored in the user information DB 440. For example, if the user is a woman in her 30s, the advertisement category determination module 450 may determine a first-priority advertisement category as a child care category, a second-priority advertisement category as a clothing category and a third-priority advertisement category as a travel category.

In addition, the advertisement category determination module 450 may determine at least one advertisement category corresponding to the user based on user context information stored in the user information DB 440. For example, when the user's interests is travel, the advertisement category determination module 450 may determine the travel category as an advertisement category regardless of the advertisement category stored in the matching table.

In this case, the advertisement category determination module 450 may give priority to the advertisement category corresponding to the user's interests among the user context information. For example, if the user is a woman in her 30s and the user's interests is travel, the advertisement category determination module 450 may change the priority of the plurality of advertisement categories stored in the matching table, and determine the first-priority advertisement category as the travel category, the second-priority advertisement category the childcare category, and the third-priority advertisement category as the clothing category.

Alternatively, the advertisement category determination module 450 may exclude at least one of the advertisement categories stored in the matching table based on user context information. For example, if the user is a woman in her 30s or a single person, the advertisement category determination module 450 may exclude the childcare category from among advertisement categories stored in the matching table.

Alternatively, the advertisement category determination module 450 may determine an advertisement category according to an emotional state or a health state of the user detected based on sensing values obtained by various sensors. For example, if it is determined that the user's health status is poor, the advertisement category determination module 450 may determine the health category as the advertisement category. As another example, if it is determined that the user is in an angry state, the advertisement category determination module 450 may determine a category corresponding to the user's preferred interests as the advertisement category.

Meanwhile, the advertisement category determination module 450 may determine at least one advertisement category corresponding to the user by using only information related to the user or by using both information related to the user and context information, but this is only an embodiment, at least one advertisement category corresponding to the user may be determined using only context information.

The advertisement display module 470 may display at least one advertisement received from the advertisement platform company 50 on the display 150. In this case, the advertisement display module 470 may determine at least one of a size and a location in which an advertisement received from the advertisement platform server 50 will be displayed based on the priority of the advertisement category. For example, the advertisement display module 470 may place an advertisement with a higher priority in an advertisement area having an upper position or a large size among the plurality of advertisement areas, and place an advertisement with a lower priority in the advertisement area having a lower position or a small size among the plurality of advertisement areas.

In addition, when the plurality of advertisements for each category are received, the advertisement display module 470 may periodically change and display the plurality of advertisements.

Figure 7:
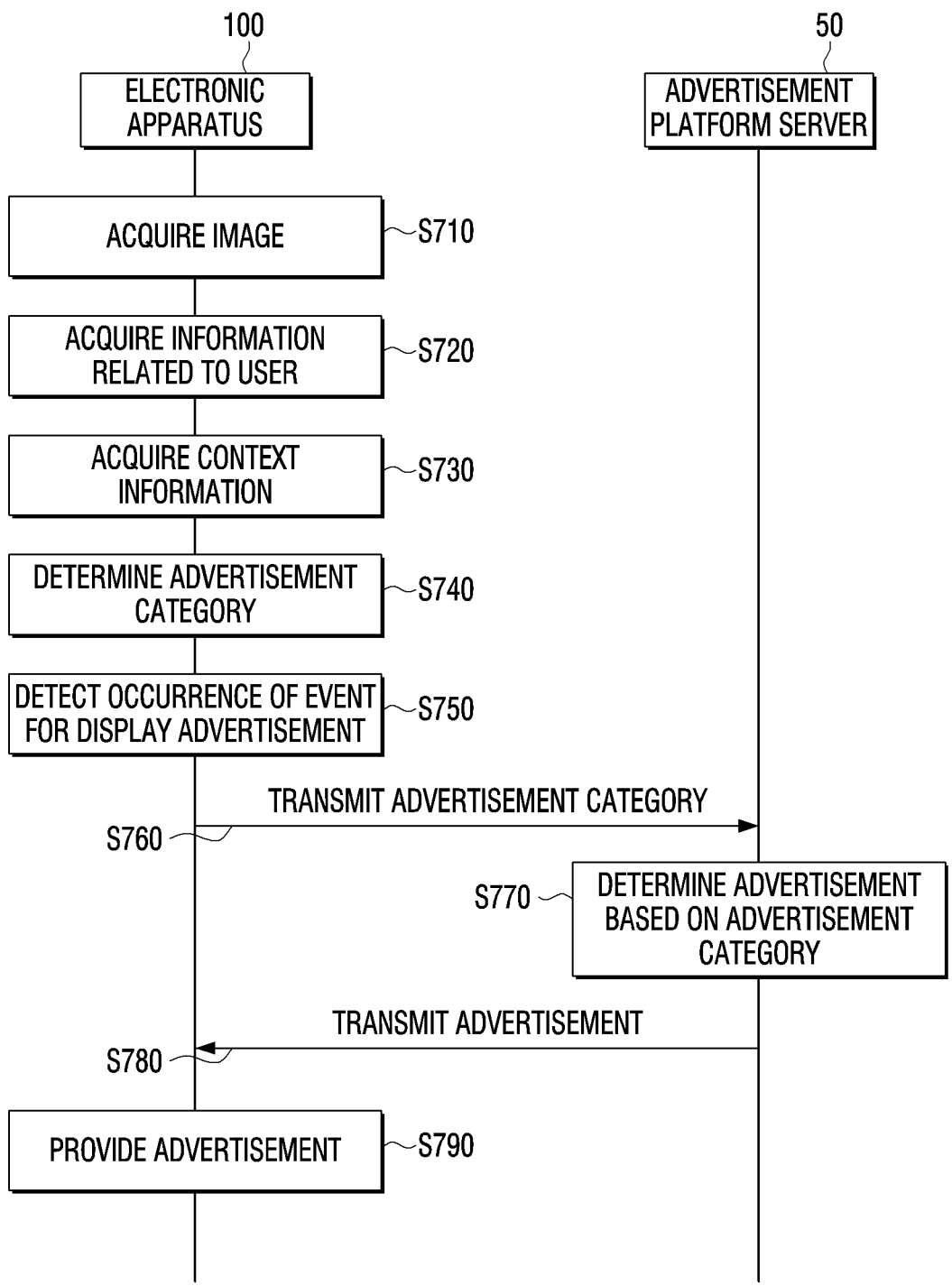
FIG. 7 is a sequence diagram illustrating a method of providing an advertisement according to information associated with the user according to an embodiment.

FIG. 7 is a flowchart illustrating a method for controlling an electronic apparatus 100 according to an embodiment.

The electronic apparatus 100 may obtain an image (S710). In this case, the electronic apparatus 100 may obtain an image including a user through the camera 110, but this is only an exemplary embodiment, and may receive an image from an external electronic apparatus.

The electronic apparatus 100 may obtain information related to the user based on the obtained image (S720). Specifically, the electronic apparatus 100 may identify the user or a person related to the user by analyzing the obtained image. For example, the electronic apparatus 100 may identify a person who appears most frequently among a plurality of people included in a plurality of images obtained through the camera 110 during the self-portrait mode as a user, and identify a person who appears more than a predetermined number of times among the plurality of people included in the plurality of images stored in the memory 130 as a person related to the user. In addition, the electronic apparatus 100 may obtain various information related to the user, such as age, gender, body size information, or the like for the person identified as the user by using an artificial intelligence model for object recognition.

The electronic apparatus 100 may obtain context information (S730). In this case, the electronic apparatus 100 may obtain context information based on usage information of various electronic apparatuses 100. For example, the electronic apparatus 100 may obtain information on the user's movement pattern based on location information of the electronic apparatus obtained by the sensor 180, obtain the user's interests based on user's search results and visit history of websites, and obtain the user's interests based on the information on the user's product purchase history.

The electronic apparatus 100 may determine an advertisement category based on information related to the user and context information (S740). In this case, the electronic apparatus 100 may determine an advertisement category corresponding to the user by using a matching table stored by matching a plurality of advertisement categories for each user type. In other words, the electronic apparatus 100 may determine at least one advertisement category information corresponding to the obtained information related to the user by using the matching table. Alternatively, the electronic apparatus 100 may add, change or delete at least one advertisement category determined based on information related to the user based on context information.

The electronic apparatus 100 may detect occurrence of an event for displaying an advertisement (S750). For example, the electronic apparatus 100 may detect various events such as an event for accessing a specific website or an event for logging in to a specific SNS.

The electronic apparatus 100 may transmit information on the determined advertisement category to the advertisement platform server 50 (S760). In this case, the electronic apparatus 100 may transmit not only information on the determined advertisement category but also priority information on a plurality of advertisement categories.

The advertisement platform server 50 may determine an advertisement based on the advertisement category (S770). In other words, the advertisement platform server 50 may determine an advertisement corresponding to an advertisement category among a plurality of pre-stored advertisements.

The advertisement platform server 50 may transmit information on the determined advertisement to the electronic apparatus 100 (S780). In this case, the advertisement platform server 50 may directly transmit information on advertisement to the electronic apparatus 100, but this is only an embodiment, and transmit information on advertisement to the electronic apparatus 100 through a server corresponding to advertisers.

Figure 8:
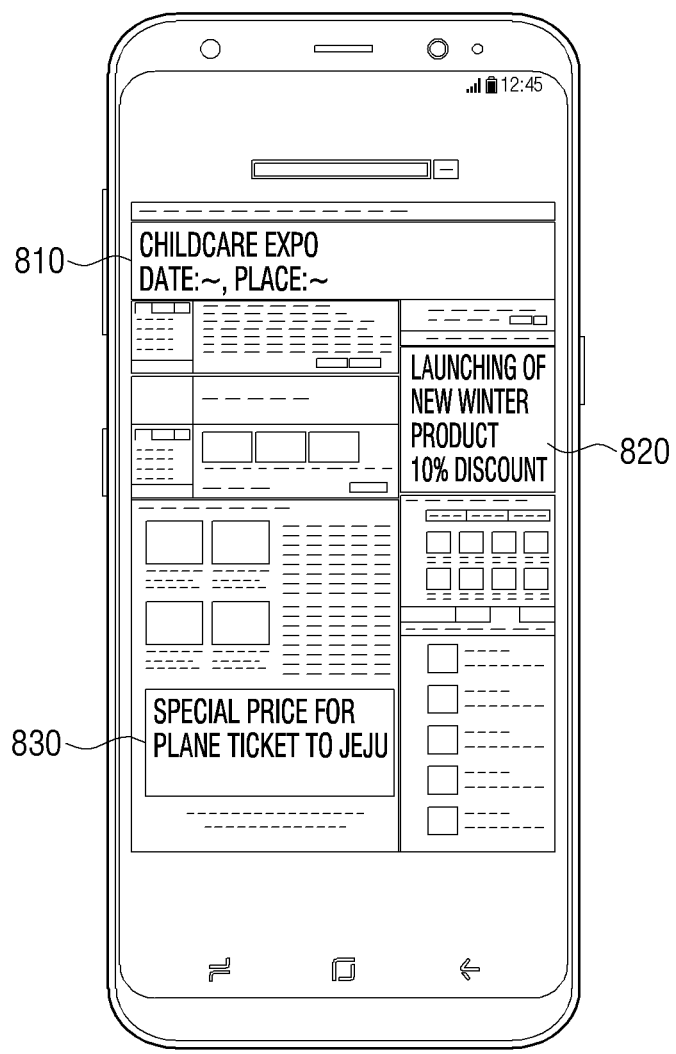
FIG. 8 is a view illustrating a method of displaying advertisements according to priority of advertisement categories according to an embodiment.

The electronic apparatus 100 may provide the advertisement received from the advertisement platform server (S790). In this case, the electronic apparatus 100 may determine the size and location of the advertisement display area based on the priority of the advertisement category corresponding to the received advertisement. For example, when the user is a woman in her 30s, as shown in FIG. 8, the electronic apparatus 100 may provide an advertisement corresponding to a childcare category, which is a first-priority advertisement category of the woman in her 30s, to the largest advertisement area 810 located at the top of the screen, provide an advertisement corresponding to a clothing category, which is a second-priority advertisement category for female in their 30s, to the advertisement area 820 located in a center area of the screen, and provide an advertisement corresponding to a travel category, which is a third-priority advertisement category of a woman in her 30s, to the advertisement area 830 located at the bottom of the screen. In other words, the electronic apparatus 100 may provide an advertisement with a high priority of advertisement in an area where a user identification can be easily made.

Figure 9:
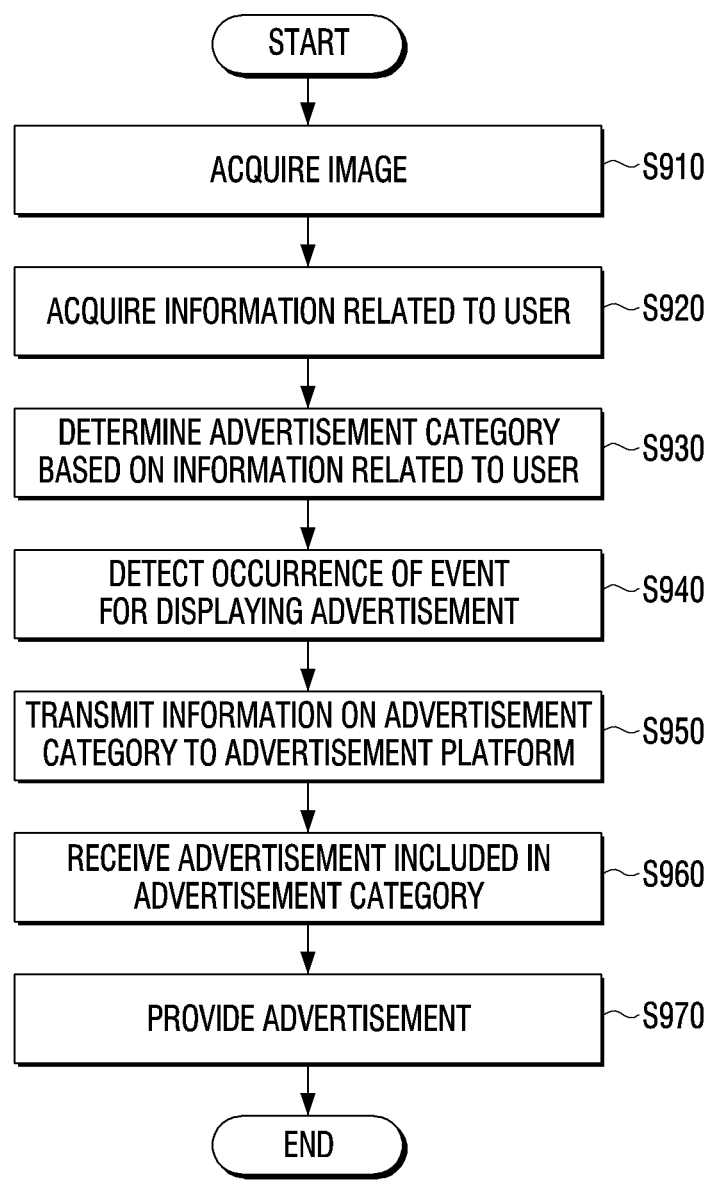
FIG. 9 is a flowchart illustrating a method of controlling an electronic apparatus according to an embodiment of the disclosure.

FIG. 9 is a flowchart illustrating a method for controlling an electronic apparatus according to an embodiment.

The electronic apparatus 100 may obtain an image (S910). In this case, the electronic apparatus 100 may obtain an image through the camera 110, but this is only an embodiment and may obtain an image from an external device.

The electronic apparatus 100 may obtain information related to the user based on the obtained image (S920). In this case, the electronic apparatus 100 may obtain the user's gender, age, and body size as information related to the user.

The electronic apparatus 100 may determine an advertisement category based on information related to the user (S930). Specifically, the electronic apparatus 100 may determine at least one advertisement category corresponding to the user based on a matching table that matches and stores advertisement categories for each user type.

The electronic apparatus 100 may detect occurrence of an event for displaying an advertisement (S940).

The electronic apparatus 100 may transmit information on the advertisement category to the advertisement platform server 50 (S950), and receive an advertisement included in the advertisement category from the advertisement platform server 50 (S960).

In addition, the electronic apparatus 100 may provide an advertisement received from the advertisement platform server 50 (S970).

By the disclosure as described above, the user may receive an optimal advertisement without the risk of leakage of the user's personal information, and the advertiser may provide the user with an optimal advertisement corresponding to the advertisement category determined based on the user information, thereby increasing the advertisement effect.

Figure 10:
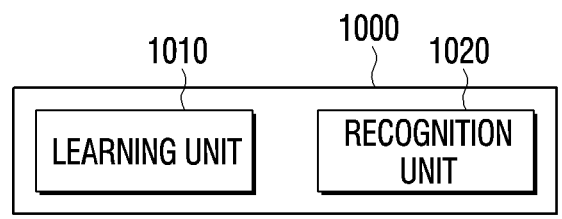
FIG. 10 is a view illustrating an operation of an electronic apparatus using an artificial intelligence model according to an embodiment.

FIG. 10 is a view illustrating a method for controlling a display apparatus, according to an embodiment.

Referring to FIG. 10, the electronic apparatus 100 may include at least one of a learning unit 1010 and a recognition unit 1020. The learning unit 1010 and the recognition unit 1020 of FIG. 10 may be implemented as a configuration of software stored in the memory 130 of the electronic apparatus 100, but this is only an embodiment, and may be implemented as a separate dedicated hardware chip.

The learning unit 1010 may generate or train an artificial intelligence model for recognizing information on a plurality of objects included in an image by using learning data. The learning unit 1010 may generate a trained model having a recognition criterion by using the collected learning data. For example, the learning unit 1010 may generate, learn, or update an object recognition model for acquiring information related to a plurality of users included in the image by using the image and information on the object included in the image as learning data. have.

The recognition unit 1020 may obtain various information by using predetermined data as input data of the trained model. For example, the recognition unit 1020 may recognize (or estimate, infer) information related to the plurality of users included in the image by using the image as input data of the trained object recognition model.

At least a part of the learning unit 1010 and at least a part of the recognition unit 1020 may be implemented as a software module or manufactured in a form of at least one hardware chip and mounted on an electronic apparatus. For example, at least one of the learning unit 1010 and the recognition unit 1020 may be manufactured in the form of a dedicated hardware chip for artificial intelligence (AI), or may be manufactured as a part of an existing general-purpose processor (e.g., CPU or application processor) or a graphics dedicated processor (e.g., GPU) and mounted in the aforementioned various electronic apparatuses. In this case, the dedicated hardware chip for artificial intelligence is a dedicated processor specialized in probability calculation, and has higher parallel processing performance than existing general-purpose processors, so it may quickly process calculation tasks in artificial intelligence fields such as machine learning. When the learning unit 1010 and the recognition unit 1020 are implemented as a software module (or a program module including an instruction), the software module may be stored in a non-transitory computer readable recording medium. In this case, the software module may be provided by an operating system (OS) or may be provided by a predetermined application. Alternatively, some of the software modules may be provided by an operating system (OS), and some of the software modules may be provided by a predetermined application.

In this case, the learning unit 1010 and the recognition unit 1020 may be mounted on one electronic apparatus, or may be mounted on separate electronic apparatuses, respectively. For example, one of the learning unit 1010 and the recognition unit 1020 may be included in the electronic apparatus 100, and the other may be included in an external server. In addition, the learning unit 1010 and the recognition unit 1020 may provide model information built by the learning unit 1010 to the recognition unit 1020 through wired or wireless, or data input to the learning unit 1020 may be provided to the learning unit 1010 as additional learning data.

Figure 11A:
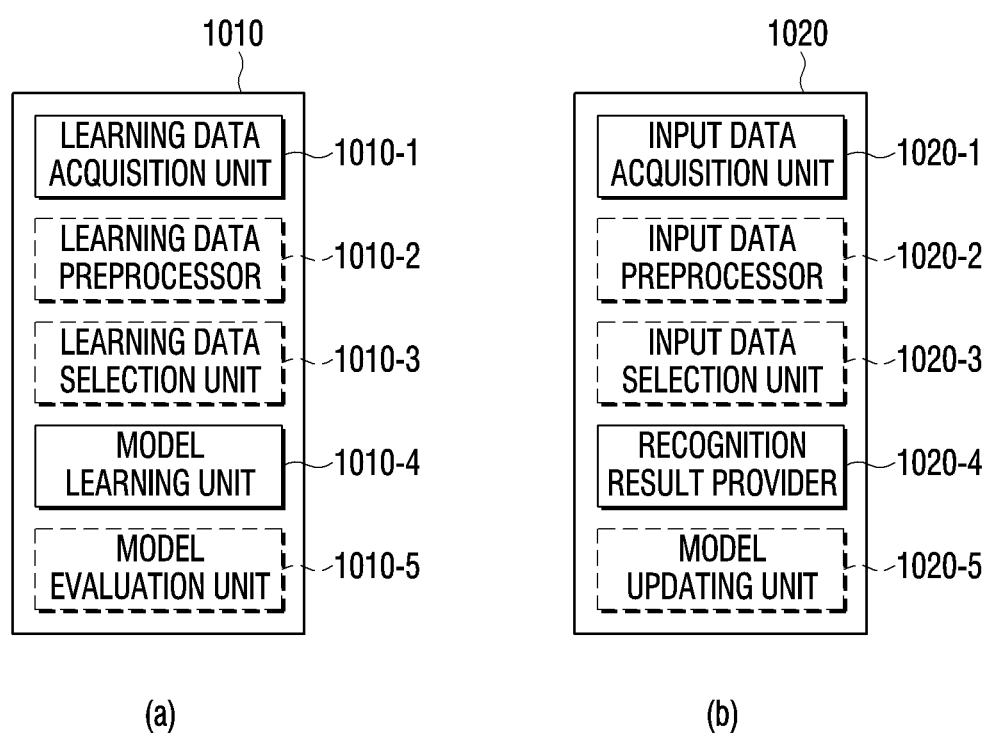
FIGS. 11A and 11B are block diagrams illustrating specific configurations of a learning unit and a recognition unit according to an embodiment of the disclosure.

FIG. 11A is a block diagram of a learning unit 1010 and a recognition unit 1020 according to various embodiments.

Referring to (a) of FIG. 14A, the learning unit 1010 according to some embodiments may include a learning data acquisition unit 1010-1 and a model learning unit 1010-4. In addition, the learning unit 1010 may further selectively include at least one of a learning data preprocessor 1010-2, a learning data selection unit 1010-3, and a model evaluation unit 1010-5.

The learning data acquisition unit 1010-1 may obtain learning data necessary for an artificial intelligence model (e.g., object recognition model). According to an embodiment of the disclosure, the learning data acquisition unit 1010-1 may obtain an image and information on the object included in the image as learning data. The learning data may be data collected or tested by a manufacturer of the learning unit 1010 or the learning unit 1010.

The model learning unit 1010-4 may learn to have a standard on how to recognize an object (especially, person or animal) included in an image by using the learning data. For example, the model learning unit 1010-4 may learn an artificial intelligence model through supervised learning using learning using at least a part of the learning data as a criterion for determination. As another example, the artificial intelligence model may learn a data recognition model through unsupervised learning which finds criteria for determining circumstances by learning the type of data for determining circumstances without further guidance. As another example, the model learning unit 1010-4 may learn the artificial intelligence model through reinforcement learning which uses feedback on whether the result of the circumstances determination according to learning is correct. In addition, the model learning unit 1010-4, for example, may learn the artificial intelligence model using a learning algorithm including an error back-propagation method or a gradient descent method, etc.

If there are a plurality of pre-established artificial intelligence model, the model learning unit 1010-4 may determine an artificial intelligence model that has a high correlation between the input learning data and basic learning data as the artificial intelligence model to be learned. In this case, the basic learning data may be pre-classified according to the type of data, and the data recognition model may be pre-established according to the type of data. For example, the basic learning data may be pre-classified by various criteria such as an area where the learning data is generated, a time at which the learning data is generated, a size of the learning data, a genre of the learning data, a creator of the learning data, a type of object in the learning data, etc.

Further, when artificial intelligence model is learned, the model learning unit 1010-4 may store the learned artificial intelligence model. In this case, the model learning unit 1010-4 may store the learned artificial intelligence model in the memory 130 of the electronic apparatus 100. Alternatively, the model learning unit 1010-4 may store the learned artificial intelligence model in a memory of a server connected to the electronic apparatus 100 through a wired or wireless network.

The learning unit 1010 may further include a learning data preprocessing unit 1010-2 and a learning data selection unit 1010-3 to improve the recognition result of the artificial intelligence model or to save resources or time required for generating the artificial intelligence model.

The learning data preprocessor 1010-2 may preprocess the obtained data so that the obtained data for object recognition can be used. The training data preprocessor 1010-2 may process the obtained data into a predetermined format so that the model learning unit 1010-4 can use the data obtained for learning for object recognition.

The learning data selection unit 1010-3 may select data necessary for learning from data obtained by the learning data acquisition unit 1010-1 or data preprocessed by the learning data preprocessor 1010-2. The selected learning data may be provided to the model learning unit 1010-4. The learning data selection unit 1010-3 may select data required for learning from among the preprocessed data. In addition, the learning data selection unit 1010-3 may select data according to predetermined criteria by learning of the model learning unit 1010-4 which will be described below.

The learning unit 1010 may further include a model evaluation unit 1010-5 in order to improve the recognition result of the artificial intelligence model.

The model evaluation unit 1010-5 may input evaluation data to an artificial intelligence model, and if the recognition result output from the evaluation data does not satisfy predetermined criteria, allow the model learning unit 1010-4 to learn again. In this case, the evaluation data may be predefined data for evaluating an artificial intelligence model.

For example, if the number or the ratio of the evaluation data whose recognition result is not accurate among the recognition results of the learned data recognition model for the evaluation data exceeds a predetermined threshold value, the model evaluation unit 1010-5 may evaluate that predetermined criteria are not satisfied.

Meanwhile, when there are a plurality of learned data recognition models, the model evaluation unit 1010-5 may evaluate whether each of the learned moving image recognition models satisfies the predetermined criteria and determine the model which satisfies the predetermined criteria as the final data recognition model. In this case, when there are a plurality of models satisfying the predetermined criteria, the model evaluating unit 1010-5 may determine any one or a predetermined number of models previously set in descending order of the evaluation score as the final data recognition model.

Referring to FIG. 11A(b), the recognition unit 1020 according to some embodiments may include an input data acquisition unit 1020-1 and a recognition result providing unit 1020-4.

In addition, the recognition unit 1020 may further selectively include at least one of the input data preprocessor 1020-2, the input data selection unit 1020-3, and a model updating unit 1020-5.

The input data acquisition unit 1020-1 may obtain data necessary to recognize an object included in the image. The recognition result providing unit 1020-4 may recognize an object included in the image by applying the input data obtained by the input data acquisition unit 1021-1 to the artificial intelligence model learned as an input value. The recognition result providing unit 1020-4 may apply the data selected by the input data preprocessing unit 1020-2 or the input data selection unit 1020-3 to be described below as input values to the artificial intelligence model to obtain a recognition result. The recognition result may be determined by an artificial intelligence model.

As an embodiment, the recognition result providing unit 1020-4 may apply the image data obtained by the input data acquisition unit 1020-1 to a learned first model to recognize (or estimate) an object (e.g., human or animal) included in the image.

The recognition unit 1020 may further include the input data preprocessor 1020-2 and the input data selection unit 1020-3 in order to improve the recognition result of the artificial intelligence model or save resources or time for providing the recognition result.

The input data preprocessing unit 1020-2 may pre-process obtained data so that the obtained data can be input to the artificial intelligence model. The input data preprocessing unit 1020-2 may process the obtained data into a predetermined format so that the recognition result providing unit 1020-4, which will be described below, may process the obtained data obtained in a predetermined format.

The input data selection unit 1020-3 may select data required for object recognition from data obtained by the input data acquisition unit 1020-1 or data preprocessed by the input data preprocessor 1020-2. The selected data may be provided to the recognition result providing unit 1020-4. The input data selection unit 1020-3 may select some or all of the obtained or preprocessed data according to a predetermined selection criterion for object recognition. In addition, the input data selection unit 1020-3 may select data according to the predetermined selection criterion by learning by the model learning unit 1010-4.

The model updating unit 1020-5 may control the artificial intelligence model to be updated based on an evaluation of the recognition result provided by the recognition result providing unit 1020-4. For example, the model update unit 1020-5 may provide the recognition result provided by the recognition result providing unit 1020-4 to the model learning unit 1010-4, such that the model learning unit 1010-4 may request to additionally learn or update the artificial intelligence model.

Figure 11B:
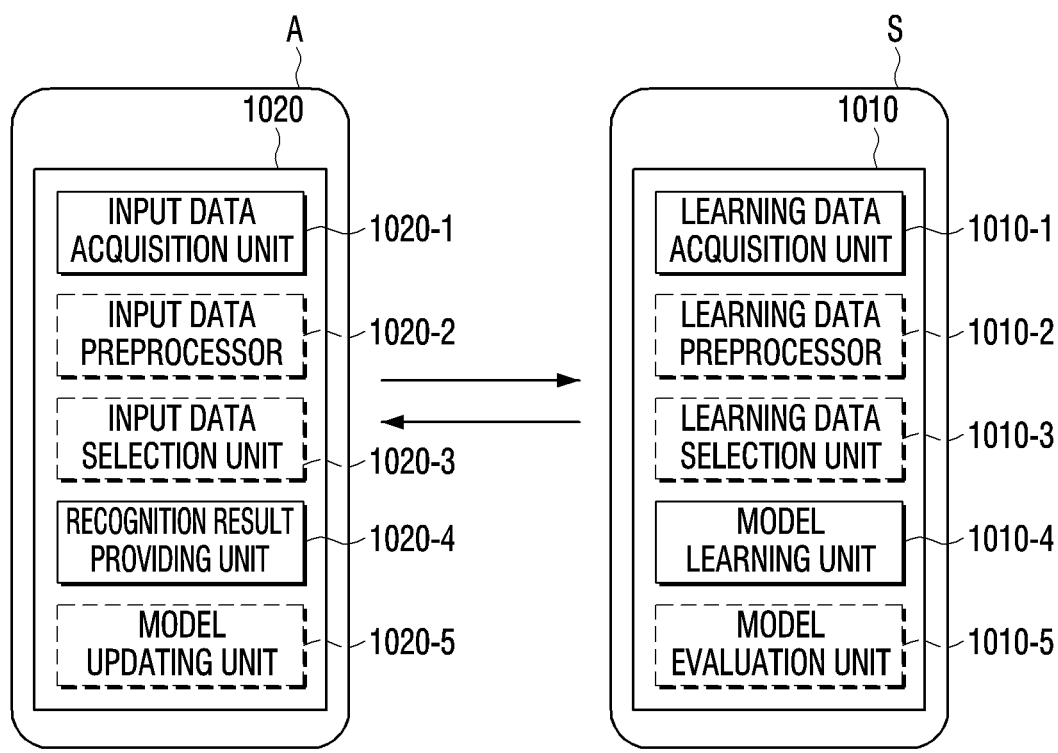

FIG. 11B is a diagram illustrating an example in which the electronic apparatus 100 and an external server S interwork with each other to learn and determine data according to an embodiment.

Referring to FIG. 11B, the external server S may learn a criterion for recognizing an object included in an image, and the electronic apparatus 100 may recognize an object included in the image by using models generated based on the result of learning by the server S.

In this case, the model learning unit 1010-4 of the server S may perform the function of the learning unit 1010 illustrated in FIG. 10. The model learning unit 1010-4 of the server S may learn an object recognition criterion (or recognition criterion) for the artificial intelligence model.

In addition, the recognition result providing unit 1020-4 of the electronic apparatus 100 may apply the data selected by the input data selection unit 1020-3 to the artificial intelligence model generated by the server S and recognize the object included in the image. Alternatively, the recognition result providing unit 1020-4 of the electronic apparatus 100 may receive the artificial intelligence model generated by the server 50 from the server 50, and recognize the object included in the image using the received artificial intelligence model.

The term "module" as used herein includes units made up of hardware, software, or firmware, and may be used interchangeably with terms such as logic, logic blocks, components, or circuits. A "module" may be an integrally constructed component or a minimum unit or part thereof that performs one or more functions.

According to an embodiment, the various embodiments described above may be implemented as software including instructions stored in a machine-readable storage media which is readable by a machine (e.g., a computer). The device may include the electronic device according to the disclosed embodiments, as a device which calls the stored instructions from the storage media and which is operable according to the called instructions. When the instructions are executed by a processor, the processor may directory perform functions corresponding to the instructions using other components or the functions may be performed under a control of the processor. The instructions may include code generated or executed by a compiler or an interpreter. The machine-readable storage media may be provided in a form of a non-transitory storage media. The 'non-transitory' means that the storage media does not include a signal and is tangible, but does not distinguish whether data is stored semi-permanently or temporarily in the storage media.

In addition, according to an embodiment, the methods according to various embodiments described above may be provided as a part of a computer program product. The computer program product may be traded between a seller and a buyer. The computer program product may be distributed in a form of the machine-readable storage media (e.g., compact disc read only memory (CD-ROM) or distributed online through an application store (e.g., PlayStore™). In a case of the online distribution, at least a portion of the computer program product may be at least temporarily stored or provisionally generated on the storage media such as a manufacturer's server, the application store's server, or a memory in a relay server.

Further, each of the components (e.g., modules or programs) according to the various embodiments described above may be composed of a single entity or a plurality of entities, and some subcomponents of the above-mentioned subcomponents may be omitted or the other subcomponents may be further included to the various embodiments. Generally, or additionally, some components (e.g., modules or programs) may be integrated into a single entity to perform the same or similar functions performed by each respective component prior to integration. Operations performed by a module, a program module, or other component, according to various exemplary embodiments, may be sequential, parallel, or both, executed iteratively or heuristically, or at least some operations may be performed in a different order, omitted, or other operations may be added.

What is claimed is:

1. An electronic apparatus comprising:
    a camera;
    a communication interface;
    a display;
    a memory including at least one command; and
    a processor operatively connected with the camera, the communication interface, the display, and the memory,
    wherein the processor, by executing the at least one command, is configured to:
        identify a person who appears most frequently among a plurality of people included in a plurality of images obtained through the camera during a self-portrait mode as a user,
        obtain age, gender, and body size information on the person identified as the user by using an artificial intelligence model for object recognition that was trained using age, gender, and body size information as learning data,
        identify at least one advertisement category among a plurality of advertisement categories based on the obtained age, gender, and body size information on the person identified as the user, and
        in response to an occurrence of an event at the electronic apparatus that triggers display of an advertisement,
            control the communication interface to transmit information on the at least one advertisement category to an advertisement platform server,
            receive an advertisement in the at least one advertisement category from the advertisement platform server through the communication interface,
            identify at least one of a size or a location in which the received advertisement is to be displayed on the display based on a priority order corresponding to the at least one advertisement category, and
            control to display the received advertisement on the display based on the identified at least one of the size or the location.

2. The electronic apparatus of claim 1, wherein the processor, by executing the at least one command, is further configured to:
    identify a person who appears more than a predetermined number of times among a plurality of people included in a plurality of images stored in the memory as a person related to the user, and
    obtain the age, gender, and body size information on the person identified as the person related to the user by using the artificial intelligence model for object recognition.

3. The electronic apparatus of claim 1, further comprising:
    a sensor for acquiring location information of the electronic apparatus,
    wherein the processor, by executing the at least one command, is further configured to:
        obtain information on a movement pattern of the user based on the location information of the electronic apparatus obtained by the sensor, and
        identify the at least one advertisement category among the plurality of advertisement categories based on the obtained age, gender, and body size information on the person identified as the user and the movement pattern of the user.

4. The electronic apparatus of claim 1, wherein the processor, by executing the at least one command, is further configured to:
    identify the user's interests based on the user's search results and visit history of websites, and
    identify the at least one advertisement category among the plurality of advertisement categories based on the obtained age, gender, and body size information on the person identified as the user and the user's interests.

5. The electronic apparatus of claim 1, wherein the processor, by executing the at least one command, is further configured to:
    obtain information on the user's product purchase history, and
    based on the obtained age, gender, and body size information on the person identified as the user and the user's product purchase history, identify the at least one advertisement category among the plurality of advertisement categories.

6. The electronic apparatus of claim 1,
    wherein the memory is configured to store a matching table for matching and storing at least one advertisement category predetermined according to a user type, and
    wherein the processor, by executing the at least one command, is further configured to identify advertisement category information corresponding to the obtained age, gender, and body size information on the person identified as the user by using the matching table.

7. The electronic apparatus of claim 6,
    wherein the matching table is configured to match and store the plurality of advertisement categories predetermined according to the user type in the priority order.

8. The electronic apparatus of claim 6, wherein the matching table is configured to be periodically updated by an external server.

9. The electronic apparatus of claim 1, wherein the event of the electronic apparatus comprises an event for accessing a specific website or an event for logging in to a specific social networking service (SNS).

10. A method performed by an electronic apparatus, the method comprising:
   identifying a person who appears most frequently among a plurality of people included in a plurality of images obtained through a camera during a self-portrait mode as a user;
   obtaining age, gender, and body size information on the person identified as the user by using an artificial intelligence model for object recognition that was trained using age, gender, and body size information as learning data;
   identifying at least one advertisement category among a plurality of advertisement categories based on the obtained age, gender, and body size information on the person identified as the user; and
   in response to an occurrence of an event at the electronic apparatus that triggers display of an advertisement,
      transmitting information on the at least one advertisement category to an advertisement platform server through a communication interface of the electronic apparatus,
      receiving an advertisement in the at least one advertisement category from the advertisement platform server through the communication interface,
      identifying at least one of a size or a location in which the received advertisement is to be displayed on a display of the electronic apparatus based on a priority order corresponding to the at least one advertisement category, and
      displaying, on the display, the received advertisement based on the identified at least one of the size or the location.

11. The method of claim 10, wherein the obtaining includes:
   identifying a person who appears more than a predetermined number of times among a plurality of people included in a plurality of images stored in a memory of the electronic apparatus as a person related to the user, and
   obtaining the age, gender, and body size information on the person identified as the person related to the user by using the artificial intelligence model for object recognition.

12. The method of claim 10, further comprising:
   obtaining information on a movement pattern of the user based on location information of the electronic apparatus obtained by a sensor of the electronic apparatus,
   wherein the identifying includes identifying the at least one advertisement category among the plurality of advertisement categories based on the obtained age, gender, and body size information on the person identified as the user and the movement pattern of the user.

13. The method of claim 10, further comprising:
   identifying the user's interests based on the user's search results and visit history of websites,
   wherein the identifying includes identifying the at least one advertisement category among the plurality of advertisement categories based on the obtained age, gender, and body size information on the person identified as the user and the user's interests.

14. The method of claim 10, further comprising:
   obtaining information on the user's product purchase history,
   wherein the identifying includes, based on the obtained age, gender, and body size information on the person identified as the user and the user's product purchase history, identifying the at least one advertisement category among the plurality of advertisement categories.

15. The method of claim 10, wherein the event of the electronic apparatus comprises an event for accessing a specific website or an event for logging in to a specific social networking service (SNS).

* * * * *